US012775873B2

(12) United States Patent
Morrison et al.

(10) Patent No.: US 12,775,873 B2
(45) Date of Patent: Oct. 27, 2026

(54) ERROR MANAGEMENT

(71) Applicant: Microsoft Technology Licensing, LLC, Redmond, WA (US)

(72) Inventors: Cecily Peregrine Borgatti Morrison, Cambridge (GB); Martin Philip Grayson, Bedford (GB); Anja Dunphy, Cambridge (GB); Edward Bryan Cutrell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1098 days.

(21) Appl. No.: 17/759,404

(22) PCT Filed: Jan. 14, 2021

(86) PCT No.: PCT/US2021/013506
§ 371 (c)(1),
(2) Date: Jul. 25, 2022

(87) PCT Pub. No.: WO2021/154509
PCT Pub. Date: Aug. 15, 2021

(65) Prior Publication Data

US 2023/0053925 A1 Feb. 23, 2023

(30) Foreign Application Priority Data

Jan. 27, 2020 (EP) .................................... 20153944

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
CPC ................................ G06N 20/00; G06N 7/01
See application file for complete search history.

(56) References Cited

U.S. PATENT DOCUMENTS 8,180,112 B2 5/2012 Kurtz et al.
8,649,604 B2 2/2014 Steinberg et al.
(Continued)

FOREIGN PATENT DOCUMENTS

WO WO-2013093173 A1 * 6/2013 ......... G06V 10/7788
WO 2017070519 A1 4/2017

OTHER PUBLICATIONS

Communication pursuant to Article 94(3) Received in European Patent Application No. 21702832.3, mailed on Jun. 25, 2024, 8 pages.

(Continued)

*Primary Examiner* — Kevin W Figueroa
(74) *Attorney, Agent, or Firm* — Alleman Hall LLP

(57) ABSTRACT

According to a first aspect, there is provided a computer-implemented method of controlling a user interface to selectively communicate perception results to a user, the method comprising: in response to an update instruction, using a current confidence level of each perception result of a set of perception results to determine whether or not to communicate that perception result at the user interface. The perception results are determined by processing sensor signals from a sensor system using at least one perception algorithm. At least one of the perception results is communicated at the user interface together with at least one piece of contextual information, without communicating the current confidence level that caused the perception result to be outputted, the current confidence level having been at least partially derived from the piece of contextual information.

20 Claims, 9 Drawing Sheets

(56) References Cited

U.S. PATENT DOCUMENTS

| | | | | |
|---|---|---|---|---|
| 8,719,208 | B2 | 5/2014 | Parks | |
| 10,094,655 | B2 | 10/2018 | Sabitov et al. | |
| 2014/0368626 | A1* | 12/2014 | John Archibald | H04N 23/80 348/61 |
| 2018/0231653 | A1* | 8/2018 | Pradeep | H04L 51/02 |
| 2018/0260680 | A1 | 9/2018 | Finkelstein et al. | |
| 2019/0220010 | A1 | 7/2019 | Leonard et al. | |
| 2019/0287296 | A1* | 9/2019 | Sipko | G01S 17/10 |

OTHER PUBLICATIONS

"Extended European Search Report Issued in European Patent Application No. 20153944.2", Mailed Date: Jul. 31, 2020, 10 Pages.
"International Search Report and Written Opinion Issued in PCT Application No. PCT/US21/013506", Mailed Date: May 7, 2021, 15 Pages.
Senan, et al., "CCTV Quality Assessment for Forensics Facial Recognition Analysis", In Proceedings of 7th International Conference on Cloud Computing, Data Science & Engineering-Confluence, Jan. 12, 2017, pp. 649-655.
Communication under Rule 71(3) received for European Application No. 21702832.3, mailed on Jun. 22, 2026, 07 Pages.

* cited by examiner

ERROR MANAGEMENT

TECHNICAL FIELD OF INVENTION

The present disclosure relates to information extraction about people from sensor signals, including, for example, facial recognition applied to video images, and in particular to the management of error associated with such information.

BACKGROUND

In machine learning (ML), probabilistic models may be used to classify or otherwise interpret data. Given an input, a probabilistic ML model predicts a probability distribution over a set of classes for a given input. The probability distribution can be used to derive a deterministic result and an associated confidence value (error). For example, the deterministic result may be an indication of the class with the highest probability and the confidence value may be the predicted probability of that class (or some other measure of confidence derived from that probability). For example, in a facial recognition context, the classes used correspond to known faces.

An end user or entity using the results of the ML process may be presented with the probability distribution or, in most cases where the end user is a human, with the most likely class and the corresponding probability or some information derived from the corresponding probability, such as a confidence value.

A model configured to interpret sensor data may be referred to as a perception model herein. Other forms of perception algorithms (i.e. not necessarily probabilistic or even machine-learning based) may also derive results from sensor signals with some associated measure of confidence.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

If the output of an ML perception model or another form of perception algorithm is to be used by a computer, for example for a further computation of analysis step, a statistical or other form of confidence value indicating how likely it is that the output is correct (e.g. the probability or other confidence level) is a useful piece of information for the computer and is in a form which is easily interpreted by the computer. However, this form of information is not easily interpreted by non-expert human users.

In general, a confidence value provides some qualitative (e.g. categorial) or quantitative (e.g. numerical) indication of how likely a result is to be correct. This can depend on various contextual factors, such as elapsed time since the result was captured.

The present disclosure provides a method of conveying perception results to a non-technical human user in a way in which he can usefully interpret the results.

According to a first aspect of the present disclosure, there is provided a computer-implemented method of controlling a user interface to selectively communicate perception results to a user, the method comprising: in response to an update instruction, using a current confidence level of each perception result of a set of perception results to determine whether or not to communicate that perception result at the user interface, the perception results determined by processing sensor signals from a sensor system using at least one perception algorithm. At least one of the perception results is communicated at the user interface together with at least one piece of contextual information, without communicating the current confidence level that caused the perception result to be outputted, the current confidence level having been at least partially derived from the piece of contextual information.

In other words, confidence levels are used to selectively suppress perception results (e.g. which confidence below a threshold). The perception model may produce a large number of results associated with a low confidence level which are of little or no use to the user, and selectively suppressing these results prevents the user being provided with unhelpful information. For non-suppressed results, rather than provide the user with the confidence value that was a factor in the system's decision not to suppress the result, the user is provided with contextual information from which the confidence value was derived (at least in part).

Selection suppression combined with the provision of the relevant contextual information has been found to be a surprisingly intuitive combination for non-technical users, allowing them to make their own assessment as to the reliability of the perception results more effectively than they could from the confidence value itself.

For example, the confidence value associated with a particular result may decay over time in the case that the system has been unable to repeat or verify the result since it was obtained. In that case, the contextual information may comprise timing information, such as a time at which the result was obtained or an elapsed time since it was obtained. It has been found that n non-technical user will find contextual information like "the result was obtained 15 seconds ago" to be more intuitive indicator of reliability than, say, "the result has a current confidence of 63.2%".

BRIEF DESCRIPTION OF THE DRAWINGS

To assist understanding of the present disclosure and to show how embodiments of the present invention may be put into effect, reference is made by way of example to the accompanying drawings, in which.

DETAILED DESCRIPTION

The described embodiments provide a method of controlling a user interface to selectively communicate perception results to a user in a way in which the user can meaningfully interpret the results. The perception results are obtained from machine learning processes, such as facial recognition or pose detection.

A human user cannot interpret statistical values associated with perception results in the same way as computers. This is particularly the case with non-technical users, for example end users of an ML product, who may not understand how the ML model generates results. Providing the user with a likelihood that an output is correct does not help him to determine whether to use or trust the information provided or not. For example, a human user, when presented with an output which has a 90% chance of being correct, would find it difficult to interpret the result and understand what the potential error may be. It is also difficult for a non-technical user to meaningfully compare results with confidence of, say, 79% and 83% effectively. Similarly, terms such as "might" are difficult for human users to quantify in a meaningful way.

Instead of providing a human user with a statistical indication of the confidence of the perception results, the user is provided with contextual information which more closely mirrors the information which a human user would use to make decisions about information perceived by the user himself. The contextual information may include a time since the perception result was obtained or an orientation of the subject of the perception result relative to a sensor collecting data to be processed.

The embodiments described herein are used in scenarios in which the user has limited or no visibility of an area in which other people (or bystanders) with whom the user is trying to interact are located. Specific examples are described later.

Figure 1:
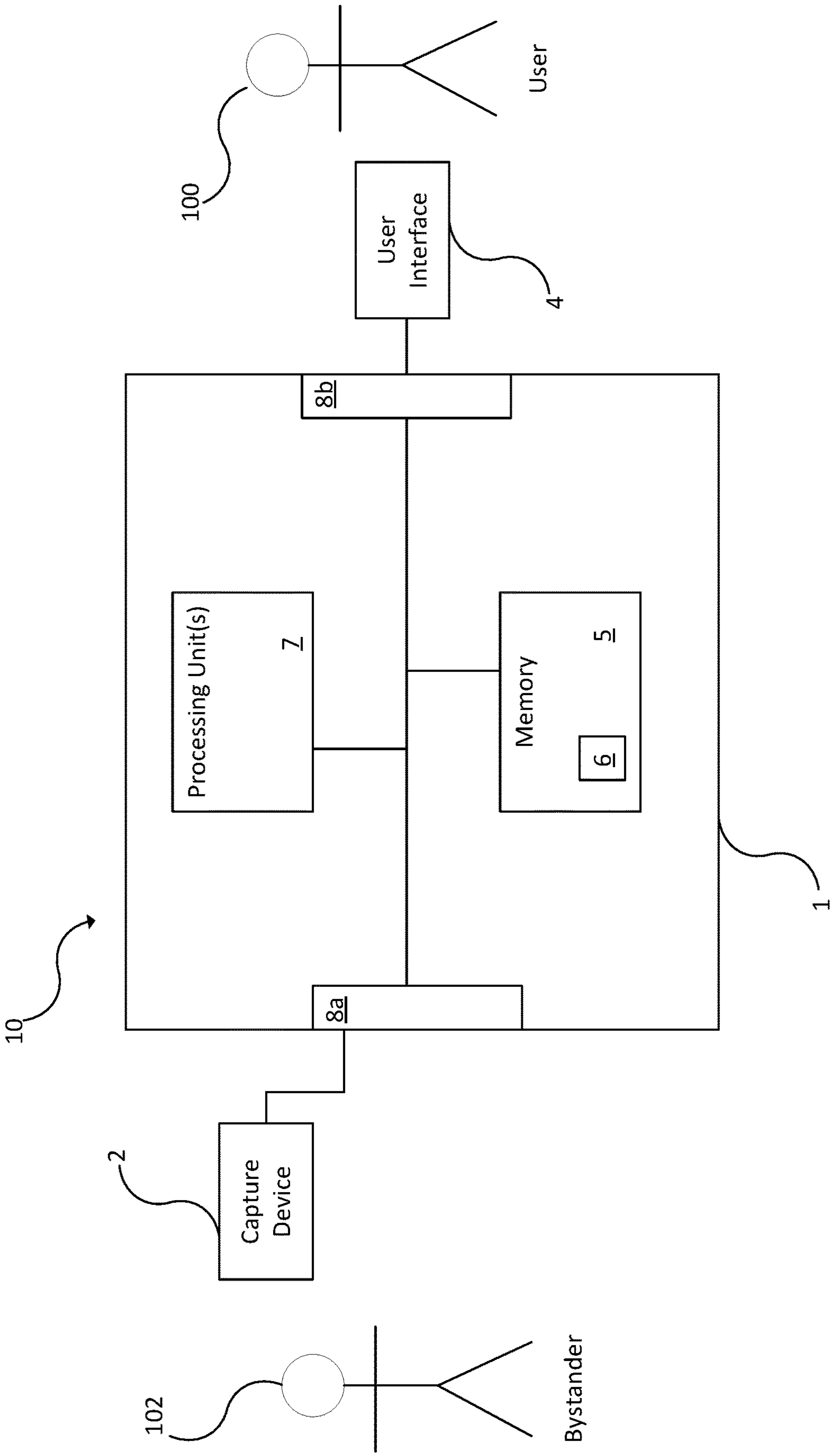
FIG. 1 is a schematic block diagram of hardware for implementing an information extraction system.

FIG. 1 shows a schematic block diagram of hardware of an information extraction system 10. The information extraction system 10 comprises a computer device 1, one or more sensor systems comprising at least one capture device 2 (one or more sensors), and a user interface 4. Although the present example comprises a computer device 1, more generally the described functions can be implemented by any computer system comprising one or more multiple devices, in a localised or distributed arrangement. The capture device 2 and user device 4 are each connected to the computer device 1 via one or more data interfaces such as I/O ports 8*a*, 8*b*. The devices 2, 4 may be connected to the computer device 1 using any wired or wireless means. The capture device 2 and user interface 4 may be integrated components of the computer device 1, or they may be external and connected to it via wireless or wired connections. One or both of the computer device 1 and user device 4 may be local devices, such that they are located within the vicinity of the capture device 2, or one or both may be remote devices, such that they are located at a remote location.

The capture device 2 captures information relating to a bystander 102. Such a capture device may take the form of a camera such that the captured information is in the form of images or video frames. The captured information is transmitted or otherwise provided to the computer device 1 as sensor signals.

The computer device 1 comprises a memory 5, one or more processing units 7, and one or more I/O ports 8*a*, 8*b*. The memory 5 stores one or more computer programs 6 which, when implemented by the processing unit(s) 7, process the senor signals and determine when the user interface 4 outputs information to a user 100 (also referred to as a receiving entity).

Figure 2:
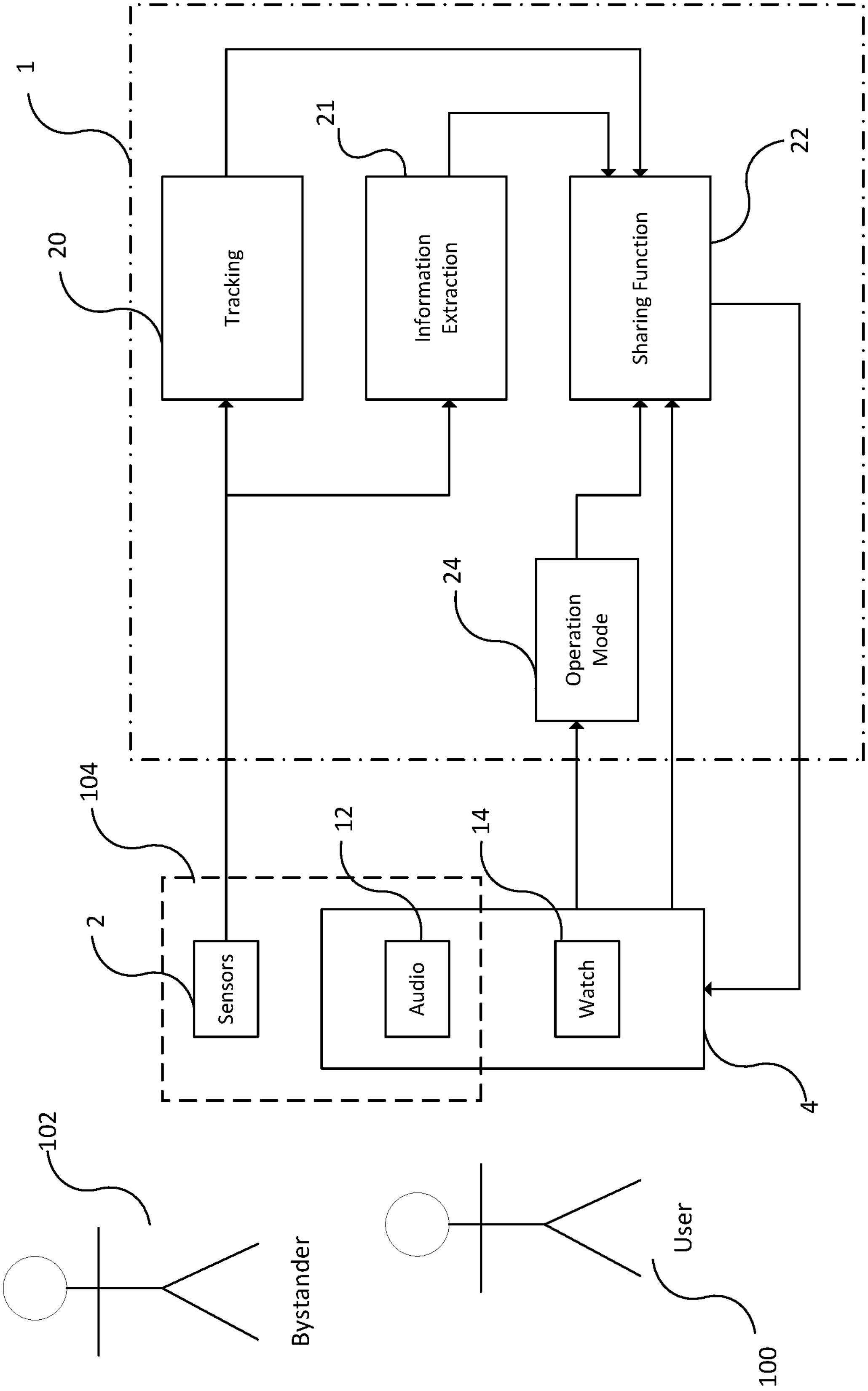
FIG. 2 is a schematic block diagram of the information extraction system.

FIG. 2 shows a schematic block diagram of certain functional components of the information extraction system 10, which generally represent different aspects of the system's functionality.

One example in which the information extraction system 10 may be implemented is in aiding interactions between a visually impaired user 100 and bystanders 102. FIG. 2 shows how the system may be used in such a scenario.

Two physical devices are provided to the user 100: an information selector 14 and a head-mountable wearable device 104 (headset). The information selector 14 is also wearable, and takes the form of a watch, for example. In some embodiments, the information selector 14 may be provided in the form so an application (app) on a user device such as a mobile phone.

The wearable device 104 comprises an audio output device 12 and at least one capture device 2 (also referred to herein as a sensor), which takes the form of an image capture device(s) (camera in the following examples). The audio output device 12 provides the user 100 with an audio description of the results of tracking and information extraction, as described later. The audio device 12 of the headset 104 and the separate information selector 14 constitute a user interface 4 available to the user 100. The user interface 4 may comprise other types of user input/output devices such as haptic devices.

Sensor signals from the sensors 2 are input into a tracking module 20. The sensor signals are used to derive a three-dimensional (3D) image which comprises a snapshot of the depth data associated with each image frame, the depth data being derived through any suitable method, as known in the art. Using the example of the sensors 2 being cameras, the tracking module 20 detects one or more bystanders 102 in the image frames and tracks each detected bystander 102 over multiple frames. While the tracking module 20 may be said, in one sense, to identify bystanders—insofar as it determines correspondence between bystanders detected across different frames (i.e. it determines that a bystander detected in one frame is the same as a bystander detected in another frame) to the extent possible—it is not attempting to attribute a specific human identity to any bystander. A detected bystander for which no further information is available is classified within the system as "unknow", and unknown bystanders are tracked in substantially the same way as "known" bystanders or "familiar" bystanders (see below).

Tracking may be based on facial pose detection which attempts to fit a generic 3D facial model to objects in the 3D frames. The use of the generic 3D facial model allows humans to be identified in the frames and the general orientation of each detected human. The approximate location of each detected human can also be found using pose detection. 3D pose and 3D location can be estimated by fitting a 3D facial model to 3D sensor data. The image capture device or devices 2 may take the form of 3D image equipment for capturing 3D special information (e.g. via one or more of stereo imaging, shaded light sensing, time-of-flight, etc.).

The sensor signals are also used by an information extraction module 21 to extract information about each of the bystanders 102 in the video stream where possible. With facial recognition, a facial template or other set of facial features is extracted, which in turn can be matched to other personal information, such as a name of the bystander, using facial recognition techniques as known in the art. The term "extracted information" covers not only data extracted directly from the sensor signals (such as facial features) but can also refer to other data obtained using the directly-extracted data (such as a name or other identity data obtained via facial recognition).

Information extraction results are linked to the bystander tracking where possible.

A "known" bystander is one for which a piece of external identity information, such as a name, has been successfully extracted. A bystander is classed as "familiar" if the level of information extracted is sufficient to conclude that the system has encountered the same bystander before (even is no external identity information is currently available), and earlier information extraction results are stored for the purpose of identifying familiar bystanders in the future.

An operation mode module 24 determines an operation mode. The user 100 can select the operation mode using the information selector 14. The operation mode determines the type of output to be presented to the user 100.

There are at least two possible operation modes: line of sight (LoS) and global.

In the LoS operation mode, the user 100 is given information about the bystander 102 directly in front of him (or in his line of sight) within a predefined distance, referred to as a social distance. The user 100 may choose this operation mode when he wants to interact directly with a potential bystander 102. It is also useful for the user 100 as a way to "scope out" the environment in an intuitive way that mimics, to some extent, the experience of a non-visually impaired user.

In the global operation mode, the user 100 is given information about all of the bystanders 102 within a predefined region, referred to as a social region. The social region is defined by the social distance and the radial field of view of the sensors 2. In the global operation mode, the user 100 may be given information such as the total number of bystanders 102 within the social region and where in the social region they are located. He may be given the identities of each of the bystanders 102 in the social region without having to directly "look" at them (i.e. without having to move so that the bystander 102 is in the line of sight). The user 100 may choose this operation mode when he enters a room, for example, and wants to know who else is in the room and some sense of where they are.

The determined operation mode, bystander tracking data, and extracted bystander information are passed to a sharing function 22. The sharing function 22 also receives inputs directly from the information selector 14, referred to as update instructions. The sharing function 22 uses all of the received inputs to determine what information about the bystanders to present to the user 100 and when, as discussed in more detail later.

The sharing function 22 shares the bystander information with the user interface 4. In the example of FIG. 2, the shared information is presented to the user 100 in audio form via the audio output device 12.

The information extraction system 10 may also comprise an output device (not shown), which is in communication with the computer device 1. The output device is used to notify the bystander 102 about tracking and data sharing of said bystander 102. For example, a light on the wearable device 104 may follow the location of the bystander 102 as he moves relative to the user 100, indicating he is being tracked. The light may turn a different colour to indicate that the bystander's information has been shared with the user 100.

Figure 3:
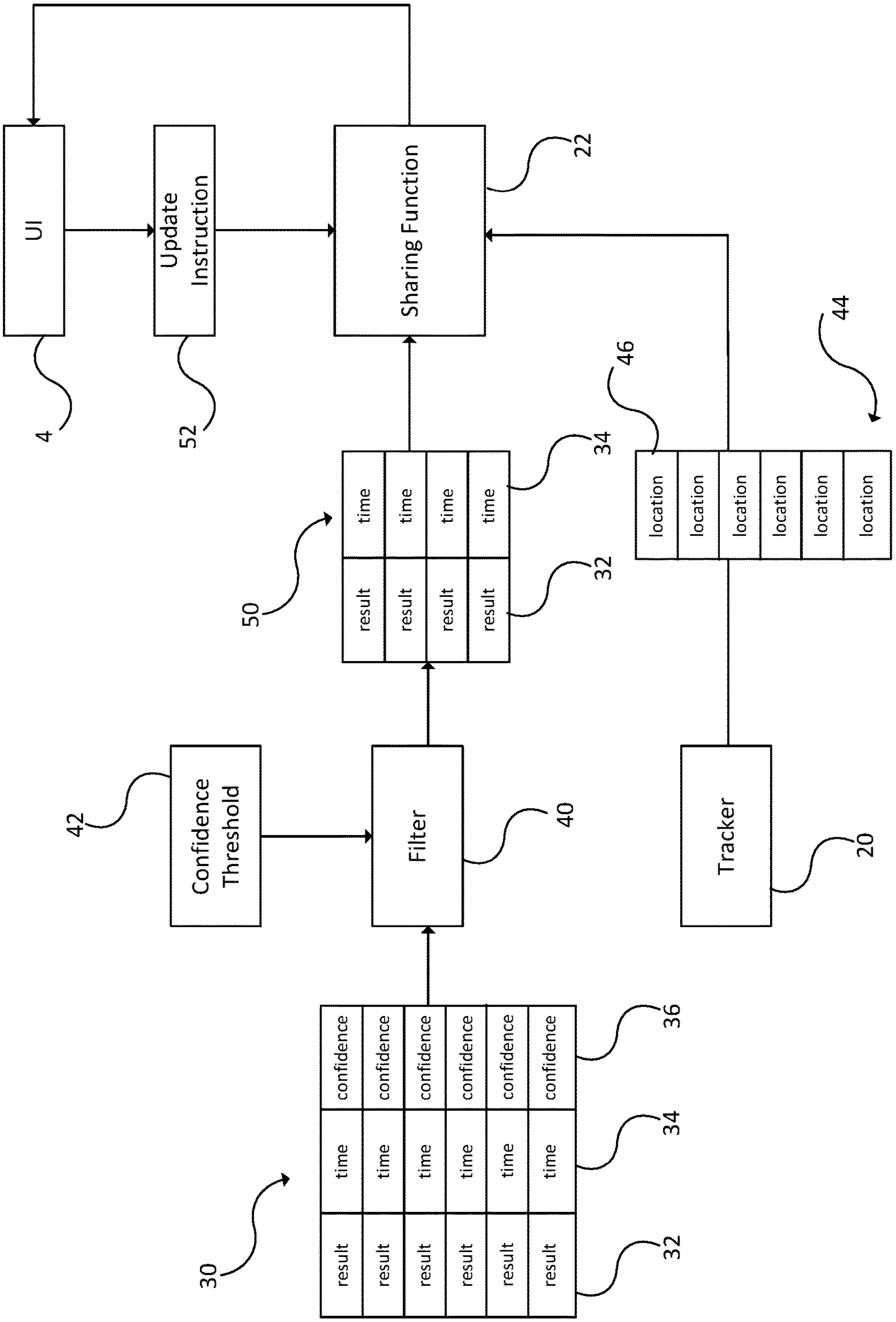
FIG. 3 is a schematic block diagram of functions relevant to a global operation mode.

FIG. 3 shows certain functional components of the system that may be used in the global operation mode.

The tracker 20 generates a set of tracking results 44. The tracking results 44 comprise a current location 46 of each detected bystander in the social region.

The information extraction module 21 produces a set of unfiltered perception results 30. The set of unfiltered results 30 comprises results 32, each result 32 associated with a time 34 at which the result was found (e.g. a timestamp) and a confidence value 36. The result 32 is the identity of the bystander 102 as found by facial recognition, for example. The set of unfiltered perception results 30 comprises a number of results 32 equal to the number of locations 46 of the set of tracking results 44.

There is a predefined confidence threshold 42 below which results are suppressed altogether, i.e. the result 32 is only communicated to the user 100 if the associated confidence 36 is above the confidence threshold 42 (i.e. meets a confidence criterion). The confidence threshold 42 is also referred to as a results threshold herein. The results threshold 42 may be 80%, for example, such that any result 32 with a confidence greater than 80% is deemed to be reliable enough to communicate to the user 100.

A filter 40 applies the confidence threshold 42 to the set of unfiltered results 30 to generate a set of filtered perception results 50. The set of filtered perception results 50 comprises only those results 32 which have a confidence level 36 above the confidence threshold 42. The set of filtered perception results 50 also comprises the time associated with each of the results 32 meeting the confidence criterion.

The filtered perception results 50 and the tracking results 44 are passed to the sharing function 22.

The user 100 indicates the information he would like to receive on the user interface 4. This user input is received by an update instruction module 52 which issues an update instruction to the sharing function 22.

Once the received update instruction is received, the sharing function 22 determines which information of the received filtered perception results 50 and tracking results 44 to communicate to the user 100 via the user interface 4.

The user 100 chooses to be in the global operation mode by selecting the global operation mode on the user interface 4. This is conveyed to the sharing function 22 via the operation mode function 24 as shown in FIG. 2.

Once in the global operation mode, the user 100 is first presented with an overview of the bystanders 102. The overview comprises the total number of bystanders in the social region, i.e. the number of locations 44 in the tracking results 44.

The user 100 can choose to receive information regarding each of the detected bystanders 102 via the issuance of a first update instruction.

The sharing function 22 access the perception results 50 and the tracking results 44 to attempt to retrieve information associated with a first bystander. The first bystander may be the left-most bystander within the social region, for example. It will be appreciated that other bystanders in the social region may be defined as the first bystander, such as the bystander closest to the user 100 or the right-most bystander.

If it is found by the sharing function 22 that there is only data for the first bystander in the tracking results 44, the bystander 102 was not able to be identified with a high enough confidence by the information extraction module 21. The user 100 is therefore given no identity of the bystander, but rather informed there is an "unknown" person.

Alternatively, if there is corresponding data in both the filtered results 50 and the tracking results 44, the user 100 is provided with the associated result 32 (the name of the bystander or that the bystander is a "familiar" stranger).

An elapsed time since the time 34 associated with the result 32 is computed and also communicated to the user 100. This is a form of contextual information which may be used by the user 100 to interpret the results.

The user 100 can use the elapsed time to aid him in interpreting the results. For example, if the total number of people in the room is given as 5, but the identities of one of the people was found 30 seconds ago, the user 100 can interpret that either the bystander concerned has left the room (or social region) since the number of people was communicated or that the bystander has changed either location or orientation such that his identity can no longer be extracted by the extraction function 21.

The user 100 indicates via the user interface 4 that he would like to receive information corresponding to the next bystander 102 in the social region, for example the next bystander 102 when rotating in a clockwise direction if the first bystander 102 is the left-most bystander 102. An update instruction is sent to the sharing function 22 such that it accesses the data relating to the second bystander 102. Again, the sharing function 22 uses the data to determine whether to communicate the result 32 and the elapsed time to the user 100.

The user 100 can continue to instigate update instructions so that information regarding all of the bystanders in the social area are communicated to the user 100 individually. Once information associated with the final user has been communicated to the user 100, the next update instruction may result in the total number of bystanders 102 being communicated to the user 100. That is, the next update instruction results in an update of all information. Alternatively, the next update instruction may result in the information regarding the first bystander being communicated again. In such an embodiment, the user 100 requests the total number of bystanders 102 in a different way on the information selector 14, for example by selecting an overview button on the information selector 14.

The user 100 may wish to receive other information about the bystander 102, for example his location relative to the user 100 (which may be derived from the location 46). Additional information can be communicated to the user 100 if he lingers on a particular bystander 102, that is he does not instigate a next update instruction immediately.

In some embodiments, the elapsed time (or other contextual information) is only communicated to the user 100 if he lingers on the associated bystander for long enough. For example, the elapsed time is not communicated to the user 100 if he requests information about the next bystander as soon as the result 32 for the current bystander 102 has been communicated.

In some embodiments, the sharing function 22 determines if the confidence value 36 associated with the result 32 is above a predefined contextual threshold. If the confidence value 26 is below the contextual threshold, the elapsed time since the time 34 associated with the result 32 is computed and also communicated to the user.

In some embodiments, the tracking results 44 also comprise a confidence value associated with each of the locations 44. This may be used in a similar way to the confidence 36 of the unfiltered perception results 30. That is, if the confidence associated with the location is below a predefined confidence threshold (a location threshold), the location 46 is discarded from the set of results.

In some embodiment, a time associated with each location 46, and the confidence level associated with each location 46 is at least in part derived from the time. If the confidence level is above the location threshold (which may or may not be the same as the results threshold associated with the perception results), an elapsed time is communicated to the user 100. For example, when the total number of bystanders 102 is communicated to the user 100, the elapsed time since that total was detected is also communicational to the user 100. Additionally, if the relative location of the bystander 102 is communicated to the user 100 when the information regarding each individual bystander 102 is communicated, the elapsed time since the location 46 was determined may also be communicated.

The information is communicated to the user 100 via the audio output 12 of the wearable device 104. It will be appreciated that, in other implementations, the information may be communicated to the user 100 in other ways as appropriate for the application.

In some embodiments, the update instruction may be issued automatically. For example, the update instruction may be issued after the result 32 and elapsed time are communicated to the user 100, such that no user input is required, or after a predefined period of time has expired (i.e. updates occur at predefined time intervals).

Figure 4:
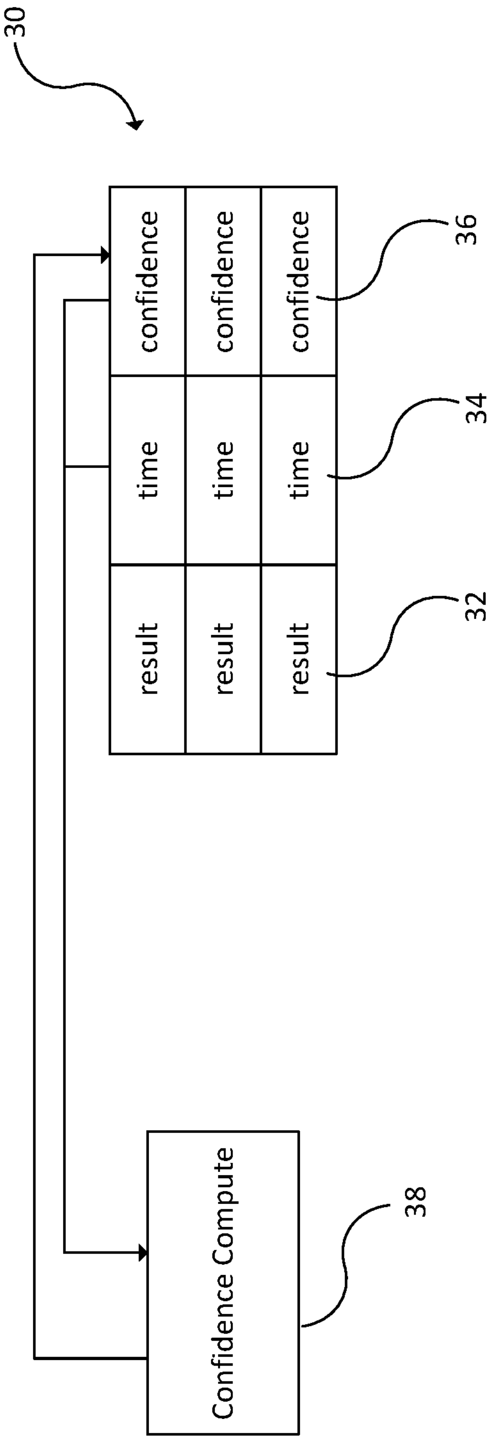
FIG. 4 shows a confidence compute component for updating a confidence associated with a result of a facial recognition process.

FIG. 4 shows how the confidence value associated with each result is computed, in a way that reflects a reduction in confidence over time in the event that the system is no longer able to verify or reproduce that result (e.g. due to a person moving out of view or becoming obstructed).

When the result 32 is first found, that is the information is first extracted from the sensor signal, the confidence value 36 may be calculated initially as an intrinsic part of the information extraction, e.g. it may take the form of a probability or score provided by a probabilistic or other score based information extraction model. The initial confidence value represents the confidence the information extraction function 21 has in a result at the point at which it is obtained.

The confidence 36 associated with each result 32 is updated as time passes. The confidence 36 and time 34 associated with the result 32 are passed to a confidence compute module 38, which uses these values to recalculate an updated confidence value 36, which is then stored in the unfiltered results table 30 associated with the relevant result 32. Typically, this would reduce the confidence 36 from its initial value as a function of elapsed time since the time 34 it was obtained.

If the updated confidence value 36 drops below the threshold confidence value, the result 32 is withheld thereafter from the sharing function 22 and the bystander 102 would thereafter be identified as "unknown" (irrespective of the bystander's consent state—on the basis that the system is simply too unsure of the bystander's identity). That is, the result 32 continues to be communicated to the user 100 as long as the confidence 36 is above the results threshold, but once it drops below the results threshold, the result 36 will no longer be provided to the user 100.

The bystanders 102 are continuously being tracked by the tracker 20 and identified by the information extractor 21. As such, the sets of perception results 30, 50 and tracking results 44 are continuously updated. This provides either a confirmation mechanism, whereby bystanders that are still there are identified again and the time 34 updated, whereas the bystanders who can no longer be identified remain associated with the original time 34. The result 32, if obtained again, is said to be verified or repeated. That is, the same result 32 is obtained again, subsequently to the result being obtained, with a confidence above the results threshold.

For example, the confidence computation component 38 may use filtering to accumulate results 32 over time, in a way that reflects both the initial confidence level with which they are captured, but also reflects the fact that the confidence in any individual result 32 decays since the time 34 at which it was captured. The initial confidence could for example be (or be derived from) an initial classification probability or other probabilistic ML result at the time the result was obtained. Examples of such filters include Kalman filters, Particle filters etc. Such filters may be Bayesian or non-Bayesian.

A filter receives cooperating results (e.g. facial recognition results determined to pertain to the same face, but captured at different times) along with their initial confidence levels, and fuses those results in a way that respects both their initial confidence levels and their respective timings, to provide a fused result along with an overall confidence level for the fused result. Where the system is able to capture multiple mutually-consistent results over a relatively short time interval, the overall confidence level of the fused result could be greater than that of any individual result, reflecting the fact that the system has effectively been able to verify the fused result multiple times in relatively quick succession. The filter is configured such that the influence of individual results on the overall, fused result reduces as their age increases (age being the elapsed time since the result was obtained). This may be immaterial if the system is continuing to capture new results that confirm the earlier result, however in the case that the system is no longer able to reproduce or verify older results, the confidence in the overall fused result will decay over time, as the age of the relevant result(s) increases, and no new results are being obtained that would support the aging results.

The contextual information for the fused filtered results could be the timing of the most recent individual results. For example, if the fused result is derived from three results 32 with elapsed times of 20 seconds, 15 seconds, and 5 seconds, the user 100 is presented with an elapsed time of 5 seconds.

The fused result may be derived from the results of different models. These results may have been obtained at the same time, such that the contextual information is the elapsed time since all of the results comprising the fused result were obtained. Alternatively, the combined results may all relate to the same person but obtained at different times. In this case, the contextual information could be the timing relating to the most recent individual results, as discussed above.

It will be appreciated that the most recent result used for deriving the fused result is the most recently obtained results which has a confidence value 36 above the results threshold. That is, no result which is deemed to have insufficient confidence is used to derive the fused result. A result associated with a confidence level 36 about the results threshold may be referred to as a relevant result, and the timing information associated with said results referred to as relevant timing information.

The above described mechanism for computing confidence levels 36 provides a mechanism by which the confidence in the result 32 decreases as the time since the result 32 was last obtained increases.

Figure 5:
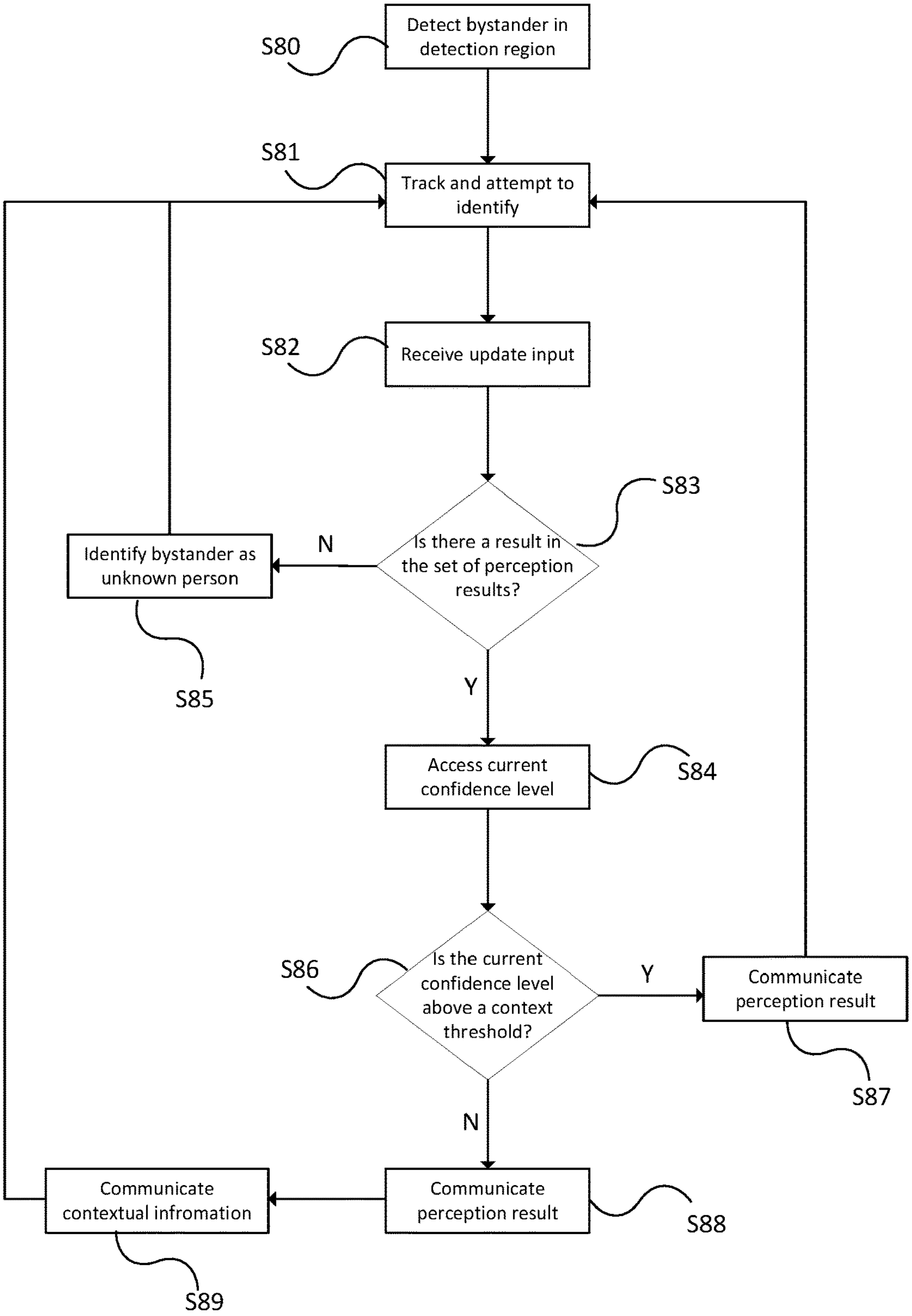
FIG. 5 shows a flowchart for an example method for determining when and how to communicate information to the user.

FIG. 5 gives an example method for determining what information is to be shared with the user 100.

At step S80, one or more bystanders 102 are detected in the field of view of the sensors 2 (also referred to as a detection region). The tracking module 20 tracks each bystander 102 and the information extraction module 21 attempts to identify the bystanders 102, at step S81.

At step S82, the user 100 indicates that he wishes to receive information regarding the bystanders 102 via the information selector 14, resulting in an update instruction being received.

At step S83, it is determined if there is a result 32 associated with the bystander 102 in question in the filtered perception result 50. If there is not, the current confidence level 36 associated with the bystander 102 in question is below the results threshold 42. The bystander 102 is identified to the user 100 as an "unknown" person at step S85.

The current confidence level 36 of the results 32 may be computed in response to receiving the update instruction (e.g. only the confidence level 36 associated with the result 32 of the bystander 102 in question is updated), or all confidence levels 36 may be continuously computed.

If, however, there is a corresponding result 32 in the filtered perception results 50, at step S84 the current confidence level 36 associated with the result 32 of the current bystander 102 is accessed from the filtered perception results 50. The current confidence level 36 is then compared to the context threshold at step S86 to determine if the confidence level 36 is above or below said threshold. The context threshold may, for example, be 90%, or any other level which is determined to be a high enough confidence that no indication of the probability that the result 36 is correct need be communicated to the user 100.

If the current confidence level 36 is above the context threshold, the system is very confident that the perception result 32 is correct, and thus the perception result 32 is communicated to the user 100, step S87. No contextual information needs to be shared with the user 100.

However, if the confidence level 36 is below the context threshold (but above the results threshold as found at step S84), there is some level of doubt in the results 32 which needs to be relayed to the user 100. As such, the perception result is communicated to the user 100, step S88, as well as the contextual information, step S89. In the example given above, the elapsed time since the time 34 at which the result 32 was obtained is the contextual information.

After information has been shared with the user 100, steps S87, S89, or not shared, step S85, as appropriate, the method returns to step S81 and the person continues to be tracked and identified where possible. That is, tracking and information extraction are continuous.

It will be appreciated that the context threshold may not be implemented. Therefore, steps S84, S86 and S87 are optional. In such as embodiment, the contextual information is always communicated it the user 100 along with the result 32, provided the user 100 does not request the result 32 associated with the next bystander prior to the contextual information being communicated.

The contextual information given to the user 100 can help them to interpret the results or decide how to gain further information. For example, if a bystander's identity was last found 30 second ago, the bystander may no longer be in the social region (e.g. he has left the room) or the bystander may have changed his orientation so that he can no longer be identified (e.g. turned his face away from the camera). The user 100 could decide to then use the LoS operation mode to check if there is still a body at the last location of the bystander. Alternatively, he could request the total number of people in the area while still in the global operation mode.

The contextual information may comprise orientation information about the bystanders. The user 100 may be presented with this information as well as or instead of the elapsed time in the case that the confidence value 36 is below the context threshold. In the example given in the previous paragraph, this would help the user 100 determine if the bystander in question had left/moved location within the room or simply turned his head so that he could no longer be identified.

Another scenario in which orientation information may be useful is when the user 100 is informed that the bystander 102 is unknown. The orientation information allows the user 100 to determine if the bystander is truly unknown to him, or if the information extraction system is unable to identify the bystander due to his orientation. If the latter, the user device 4 may provide the user 100 with guidance help, for example in the form of audio cues, which aid in guiding the user 100 to the bystander 102 such that the relative position of the bystander 102 to the user 100 is such that the bystander can be identified (e.g. the face of the bystander 102 is captured in the video frames). The user 100 may be required to change his physical location, or simply turn his head so that the bystander 102 is captured by the sensors 2 in such a way that his information can be extracted.

The confidence level 36 may additionally be derived from the output of at least one other model.

For example, the tracking results 44 comprise information about 5 people. The unfiltered perception results 30 comprise information about 6 people. This indicated that one or other of the tracking module 20 and information extraction module 21 is not outputting correct results 44, 32. The contextual information is used to update the confidence level 36. In addition, the discrepancy between the tracking results 44 and the unfiltered perception results 30 is used to update the confidence level 36.

In some embodiments, the results of the more robust model (here the tracking module 20) may be assumed to be correct, and one or more of the confidence levels 36 of the unfiltered perception results 30 modified. The confidence levels 36 may be modified proportionally (or by some other function) to their current confidence level 36 or the elapsed time. That is, either the results with a lower current confidence level 36 or a higher elapsed time are reduced to a greater extent than those with a higher current confidence level 36 or shorter elapsed time. Alternatively, all confidence levels 36 may be reduce by the same amount (either the same absolute amount or the same proportion). The amount of reduction may depend on the amount of difference between the results of the different models.

In other embodiments, the current confidence associated with each of the model outputs 30, 44 is assessed to determine which of the results 30, 44 is more likely to be accurate. The confidence levels associated with the results 30, 44 which are determined to be less accurate are modified appropriately. The confidence here may be derived from the confidence levels, the elapsed time, and/or any other contextual information.

Some example applications of the information extraction system will now be described.

Wearable Device of Aiding Interactions

Figure 6:
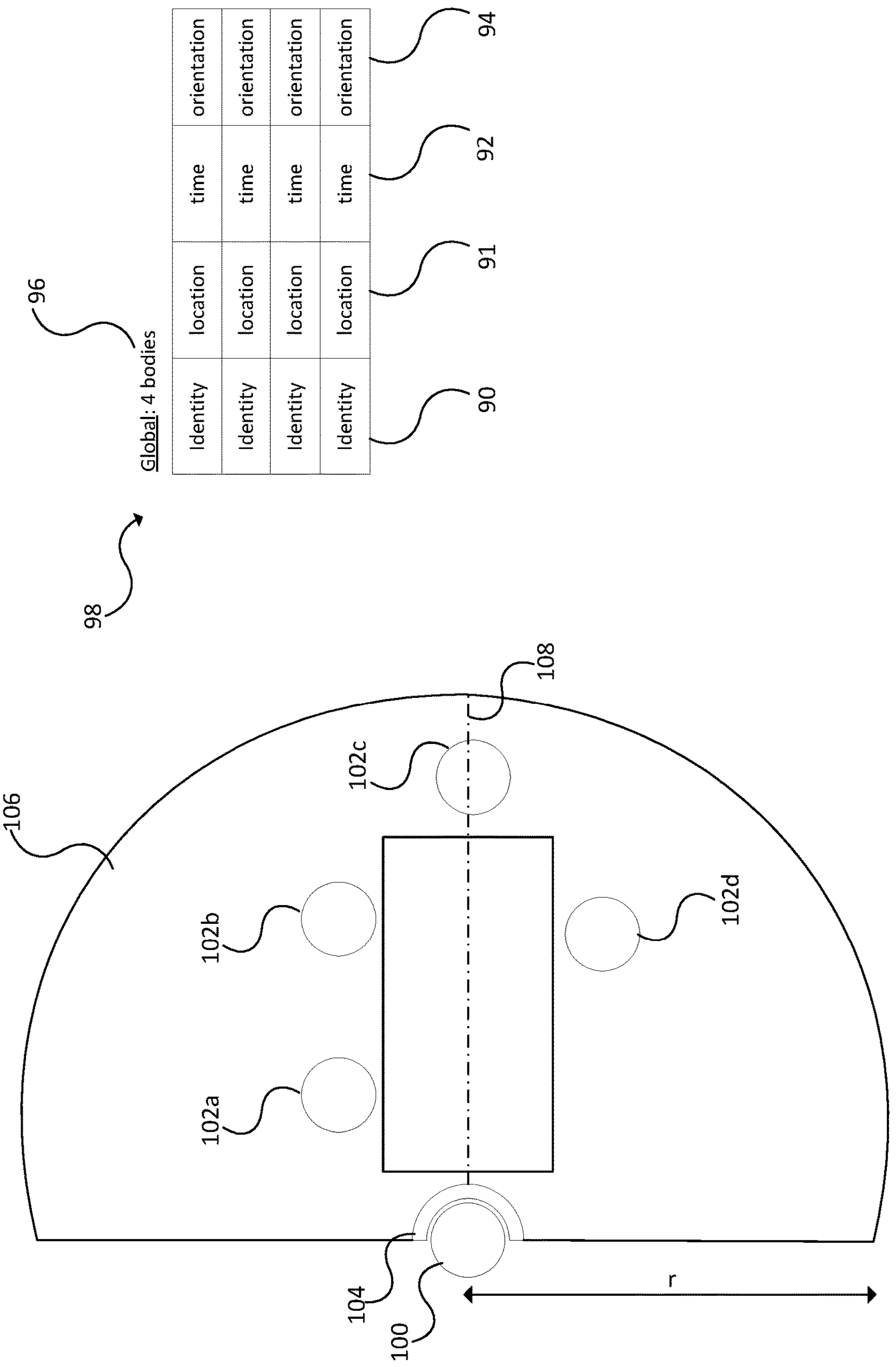
FIG. 6 shows an example of the information extraction system being used in a social environment to aid interactions between a user and multiple bystander.

Expanding on the example application set out above, FIG. 6 shows an example of a head-mountable wearable device 104 being used to aid the user 100 and the bystanders 102*a*, 102*b*, 102*c*, 102*d* to interact, where the user 100 is visually impaired. The user 100 is wearing the wearable device 104. The wearable device 104 is fitted with sensors 2 in the form of cameras. The cameras are able to capture image data over 180°. An example head-mountable wearable device 104 is described later with reference to FIG. 8.

There is a predefined semi-circular social region 106, with a radius r from the centre of the wearable device 102. The social region is the region in which it would be expected that social interaction between the user 100 and another person would occur. The size of this social region 106 depends on the environment of the user 100. For example, the social region 106 has a smaller radius r when the user 100 is in a busy location, such as on a busy bus where the user 100 is not likely to interact with any bystanders 102 who are not very close to him, than when the user is in a less busy area, such as in a meeting room in which the user 100 may wish to interact with all bystanders 102 in the room. The radius r is adjustable to suit the environment of the user 100. In a relatively non-busy environment, such as a classroom or office, the radius r may be around a metre or a few metres. The social region 106 may be the same as the field of view of the sensors 2 or it may be a subset of said field of view. One advantage of having a social region 106 smaller than the field of view of the sensors 2 is that the user 100 only receives information about the bystanders 102 with whom he is likely to interact with.

The social region 106 defines the area is which bystanders 102 may be announced to the user 100. There is a line of sight 108 which extends from the wearable device 104 to the edge of the social region 106 directly in front of the user 100 (i.e. the line of symmetry of the social region 106). This is used in the LoS operation mode, such that only bystanders 102 who intersect with the line of sight 108 are announced to the user 100. In the LoS operation mode, it may only be the closest bystander 102 intersecting the line of sight 108 who is announced to the user 100 if more than one bystander 102 is intersecting the line of sight 108 within the social region 106.

In the example of FIG. 6, the user 100 is at a table with four bystanders 102*a*, 102*b*, 102*c*, 102*d*. All four bystanders 102*a*, 102*b*, 102*c*, 102*d* are within the social region 106 such that tracking an identification information about them is being shared with the user 100. Note that a bystander 102 may be tracked and identified when outside of the social region 106 if within the field of view of the sensors 2. This is to improve the responsiveness of the system, to the benefit of both the user 100 and any bystanders 104.

A set of global results 98 is shown comprising a total body count 96 and individual information associated with each bystander 102*a*, 102*b*, 102*c*, 102*d*.

The individual results may comprise the identity 90 of each bystander, his location 91 relative to the user 100, the elapsed time 92 since the perception result 32 was found, and/or his current orientation 94.

The identity 90 is the perception results 32, e.g. the bystander's name or on indication that he is a familiar stranger, in the case that the confidence level is greater than the results threshold, or "unknown" if the confidence level of the perception result 32 is below the results threshold.

The elapsed time 92 and current orientation 94 are examples of contextual information. In some embodiments, these are only present in the global result 98 and communicated to the user 100 if the confidence level 36 is below the contextual threshold. In other embodiments, this information is always present in the global results 98 and may be presented to the user 100 if he lingers on a single bystander 102*a*, 102*b*, 102*c*, 102*d* for long enough even if the confidence level 36 is above the context threshold.

The user 100 selects the global mode and request the total body count 96 via the information selector 14. The user 100 is informed that there are 4 people in the social area 106.

The user 100 then initiates an update instruction to be issued.

The information about the first bystander 102*a* is shared with the user 100. This information is accessed from the global results 98. The identity 90 is announced to the user 100 via the audio output device 12 of the headset 104. The other information 91, 92, 94 may also be communicated to the user 100.

It will be appreciated that the global results 98 may not be stored as shown in FIG. 6. Instead, the filtered perception result 50 and the tracking results 44 are accessed to determine the information to be communicated each time information is communicated to the user 100 such that the set of global results 98 are never compiled. The set of global results 98 is, in such an embodiment, simply a representation of the information that can be rendered available to the user 100.

The location 91 of the bystander relative to the user 100 may not always be a component of the global results 98. In some embodiments, the location 91 may be contextual information. For example, if the bystander 102*a*, 102*b*, 102*c*, 102*d* is far away, the image of the bystander 102*a*, 102*b*, 102*c*, 102*d* may not be of a high enough quality for his information to be extracted with a high enough confidence. In other embodiments, the location 91 is not contextual information provided to aid the user 100. That is, the confident level 36 does not need to be below the context threshold for the user 100 to be presented with the location 91. Instead, the location 91 is communicated to the user 100 as just another piece of information.

When the user 100 wishes to receive information associated with the next bystander 102*b*, he indicates as such via the information selector 14 and an update instruction is issued. The relevant information in the global results 98 is accessed and communicated to the user 100 as appropriate.

This can be repeated for each of the other bystanders 102*c*, 102*d* until the information associated with each bystander 102*a*, 102*b*, 102*c*, 102*d* has been communicated to the user 100.

The user 100 may choose to hear the information associated with a previous bystander 102*a*, 102*b*, 102*c*, 102*d*. For example, if he has just received information about the second bystander 102*b*, the user 100 can choose to move onto the next bystander 102*c* or return to the first bystander 102*a*. The user 100 instructs the sharing function 22 which bystander 102*a*, 102*c* he wishes to receive information about via the information selector 14. For example, the information selector 14, when taking the form of a watch, may comprise a rotatable face, or portion of the face, which the user 100 rotates in the direction of the bystander 102*a*, 102*b*, 102*c*, 102*d* he wishes to receive information about. Here, he rotates the face clockwise to receive information about bystander 102*c* and anti-clockwise to receive information about bystander 102*a*.

The user 100 receives the information about the next bystander 102 in real time upon issuing an update instruction. That is, the current locations of the bystanders 102 is taken into accounts when communicating the individual information to the user 100. In some instances, this may result in the information about a single bystander 102 being repeated in a single rotation around the group of bystanders 102. For example if the bystander 102 moves relative to the other members of the group before the user 100 has requested information about the bystander 102 located after the new location of the moved bystander 102, e.g. the first bystander moves such that he is between the fifth and sixth bystander before the user 100 has requested information about the sixth bystander—the next update instruction will result in the first bystander's information being shared again. In such a scenario, the number of total bodies communicated to the user 100 would be one less than the number of identities communicated to the user 100 (since one bystander is announced twice).

In some embodiments, a static "snapshot" of the user's environment is used to communicate information to the user 100. That is, the locations and identities of the bystanders 102 as a single point in time are used to inform the user 100. In order to get more recent information, the user 100 requests the overall global information again, at which time a new snapshot of the global results is taken. Being able to compare across different snapshots in this way presents a user friendly option for the user 100 to identify changes in his social surroundings.

Figure 8:
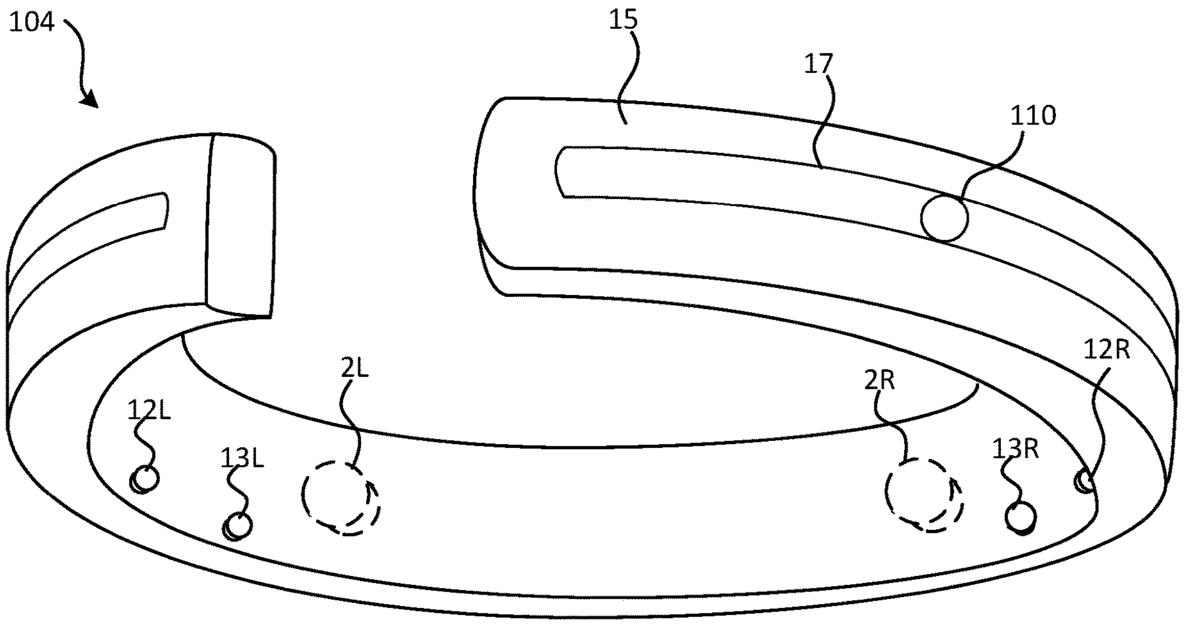
FIG. 8 is an example of a wearable device which may be used to house the information extraction system.

FIG. 8 shows an example head-mountable wearable device 104 (headset).

The wearable device 104 comprises a headpiece 15, which is a headband, arranged to be worn on the wearer's head. The headpiece 15 has an inner curvature intended to wrap around the wearer's head above their ears.

For ease of reference herein, all description pertaining to the left-hand component also pertains to the right-hand component because the components are essentially identical apart from being mirror images of each other.

The wearable device 104 also comprises one or more cameras 2—stereo cameras 2L, 2R mounted on the headpiece 15 and configured to capture an approximate view ("field of view") from the user's left and right eyes respectfully in this example. The cameras are located towards either side of the user's head on the headpiece 15, and thus capture images of the scene forward of the device form slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

Left and right channel speakers, earpiece or other audio output transducers are to the left and right of the headband 15. These are in the form of a pair of bone conduction audio transducers 12L, 12R functioning as left and right audio channel output speakers. These form part of the user interface 4 in this example.

In some embodiments, the headband 15 also comprises a, LED array 17 (i.e. a basic external display). The LED array 17 extends at least as far as the notification region. An illuminated section 110 is provided to indicate to the bystander 102 that he is being tracked and when his information is being shared with the user 100. The illuminated section 110 can move to follow the bystander 102 if he moves. The illuminated section 110 changes colour, for example from white to green, when the bystander's information is shared with the user 100.

The wearable device 104 may comprise other components that are not shown, such as dedicated depth sensors, additional interfaces, one or more loudspeakers, one or more haptic output devices, etc.

Figure 9:
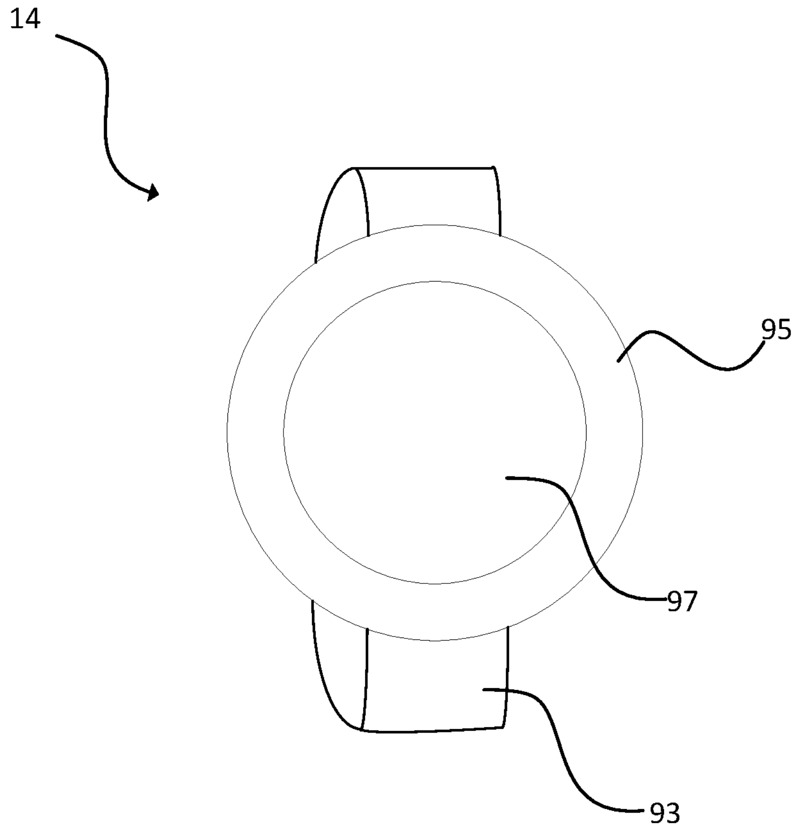
FIG. 9 is an example of a wearable device which may be used by the user to select the information he wishes to receive.

Though not evident in FIG. 9, the processing units 7 and memory 5 are housed in the headband 15. Alternatively, these may be housed in a separate housing connected to the components of the headband 15 by wired and/or wireless means. For example, the separate housing may be designed to be worn as a belt or to fit in the wearer's pocket, or one or more of these components may be housed in a separate computer device (smartphone, tablet, laptop or desktop computer etc.) which communicates wirelessly with the sensors, lights, and audio devices apparatus in the wearable device 104, whereby the headset and separate device constitute the information extraction system 10.

FIG. 9 shows an example information selector 14 taking the form of a watch to be worn on the user's wrist.

The information selector 14 comprises a strap 93, a face 97, and a rotatable ring 95. The rotatable ring 95 is a ring formed around the face 97, which is moveable relative to the face 97. The rotatable ring 95 is used by the user 100 to implement an update instruction being sent and to indicate which person he would like to receive information about next. For example, if the user 100 would like the receive information about the bystander 102 to the right of the bystander 102 about whom he has just received information (the current bystander 102), the user 100 turns the rotatable ring 95 clockwise.

The face 97 is also a user interface 4. The user may use the face 97 to, for example, select the operation mode and/or switch between the overall global results (e.g. the total number of people 96 in the social region 106) and the individual global results (identity 90, location 91, time 92, and/or orientation 94).

The user 100 in the present implementation is visually impaired. The face 97 may be a touch-screen interface. The information selector 14 may comprise one or more haptic actuator 2 to aid the user 100 navigate the user interface 4. The face 97 may comprise physical buttons which the user 100 selects to implement different functions (e.g. the different operation modes). The buttons may have physical indicators, such as words in braille or 3D symbols, to aid the user 100 when using the information selector 14. The information selector 14 may provide audio cues to the user 100 via one or more audio outputs 12 which aid the user 100 in navigating the user interface 4.

Video Calls

Another example application of the information extraction system is for use during video calls. Note that the information extraction system as shown in FIG. 2 applies in this application, however different user interfaces 4 may be used. The user interface 4 may be a remote computer device via which the user 100 is able to access an online platform, for example, which allows him to view a live video and extracted information. In some embodiments, the sensors 2 are not housed with any user interfaces 4. For example, the sensors 2 may be a webcam integrated into a user device 4 (such as a laptop or mobile phone) or may be a free-standing camera.

The user 100 is at a remote location to one or more of the other participants (bystanders 102) in the video call.

In some instances, the user 100 may wish to receive extracted information about the other participants during the video call. For example, he may be unable to receive a video image of the other participants so requires some other information to be able to know who is present on the video call. The user 100 may require further information about the participants of the video call even if he is able to receive the video image, for example it may be useful for the user to have the identities of the participants displayed to him during the meeting, or the field of view of the camera used for the capturing the live video to be displayed to the user 100 may be smaller than the field of view of the sensors 2 and not capture all of the participants of the video call at the same time.

The information extraction system functions in fundamentally the same way as in the application set out above (aiding interactions). The sensor signals are used to track participants and extract information where possible. The perception results 32 are only communicated to the user 100 if the associated confidence level 36 is above the results threshold. Additional contextual information is provided to the user 100 if the confidence level 36 is below the context threshold but above the results threshold.

The information is communicated to the user 100 via the user device 4. The information may be provided via the audio output device 12, e.g. a loudspeaker, or may be rendered visually to the user 100. The visually rendered information may be in the form of a list or table, such as the global results 98 shown in FIG. 6. Alternatively or additionally, the results may be rendered on a map. The map may identify, for example, relative locations of each participant, the information about the participants being provided either on the map or adjacent to the map. If a video stream is viewable on the user device 4, the video may be annotated visually so that the information associated with each bystander is displayed on the video. The individual information may be provided adjacent to the video stream, such that there is a video portion and a text portion of the display of the user interface 4.

Figure 7:
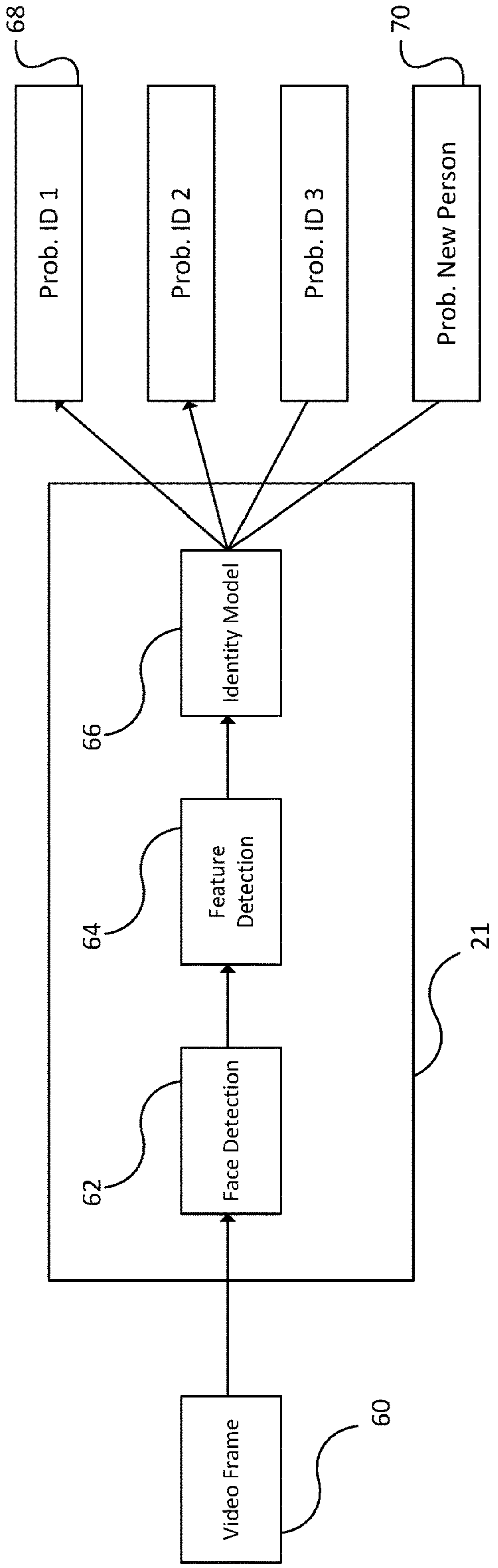
FIG. 7 is a schematic block diagram of an information extraction module.

FIG. 7 is a schematic diagram of the information extraction module 21, illustrating how the set of unfiltered results 30 is derived. A video frame 60 is input into the information extraction module 21 and is processed by a face and/or pose detection module 62 to detect regions of interest in the video frame 60. A feature detection module 64 attempts to detect features in the identified regions of interest.

The detected features are used by an identity model 66 to attempt to match the detected features to an identity. A set of identities is stored. The set of identities may include both labelled identities, e.g. Alice, Bob, etc., and unlabelled identities, e.g. Familiar Stranger 1, Familiar Stranger 2, etc. Each identity in the set of identifies is associated with an ID number. The identity module 66 calculated a probability 68 that the detected features are associated with each of the ID numbers. The identity model 66 also calculates a probability that the detected features are those of an unknow, or new, person 70.

The identity associated with the ID number with the highest probability 68, 70 is determined to be the result 32 for said bystander. The probability 68, 78 is used to derive the confidence value 36. The unfiltered results 30 are filtered by confidence and only input to the sharing function 22 if the confidence 36 is above the confidence threshold.

The above disclosed applications use the information extraction system to identify people. However, it will be appreciated that the information extraction system may be used to track and identify other objects. For example, object recognition may be used to identify different types of objects in the field of view of the sensors 2. The detected objects may be identified either by a type, or they may be identified more specifically (e.g. Amy's car or the name of a pet). If the object cannot be identified in any way, the object is identified as an "unknown" object. As above, contextual information is communicated to the user 100 in the event that the confidence level associated with the identity is below the context threshold. In this embodiment, there may be an additional confidence threshold, below which the specific identity (e.g. name of the pet) is not communicated to the user 100 but the type of object (e.g. dog) is communicated to the user 100.

The disclosed information extraction system may, therefore, be used in a number of different contexts. The information extraction system may be implemented when any automatic recognition or classification algorithms are used. The perception systems may include facial recognition, pose tracking, gaze detection, or object recognition, for example. It will be appreciated that other perception systems may also be implemented with the disclosed information extraction system.

The presence of bystanders 102 may be communicated to the user 100 in a number of different ways depending on the level of information extracted about the bystander 102. This may be implemented instead of or as well as communicating the total number of bystanders 102 in the social region to the user 100. For example, an unknown bystander 102 may be communicated to the user 100 by a "clicking" sound and an identified bystander 102 by a "bump" sound. The sounds may be played such that they appear to be coming from the location of the bystander 102. For example, if the unknown bystander is 1 m away from the user 100 to the left, the clicking sound is played such that it appears to be originating from a point 1 m away from the user 100 to the left (i.e. the location of the bystander 102). In some embodiments, a click is played for any detected object (in some embodiments, any object above a size threshold) and a bump sound played when it is detected that there is a face (i.e. that the detected object is a person).

According to a first aspect of the present disclosure, there is provided a computer-implemented method of controlling a user interface to selectively communicate perception results to a user, the method comprising: in response to an update instruction, using a current confidence level of each perception result of a set of perception results to determine whether or not to communicate that perception result at the user interface, the perception results determined by processing sensor signals from a sensor system using at least one perception algorithm; wherein at least one of the perception results is communicated at the user interface together with at least one piece of contextual information, without communicating the current confidence level that caused the perception result to be outputted, the current confidence level having been at least partially derived from the piece of contextual information.

The at least one perception algorithm may comprise at least one of: a facial recognition algorithm, a pose tracking algorithm, and an object recognition algorithm.

The piece of contextual information may be a timing of the perception result, such as an elapsed time since the perception result was obtained, or a time at which it was obtained.

The current confidence level may be derived from at least one initial confidence level pertaining to the result and decays as the age of the perception result increases in the event that the system is unable to verify or repeat the result subsequently.

The piece of contextual information may comprise position information about a relative position of an entity relative to the sensor system, the perception result pertaining to the entity.

The user may be provided with cues via the user interface to guide the user such that the entity is in a better relative position to the sensor system, the better relative position being a relative position at which the perception result can be obtained with a higher confidence level.

The at least one perception result and the piece of contextual information may be communicated in non-visual form.

The update instruction may be instigated either manually by the user via a user input device or automatically.

The at least one perception result may be a filtered perception result derived by filtering individual cooperating perception results in dependence on respective individual contextual information associated therewith.

The individual perception results may be filtered in dependence on their individual contextual information and respective initial confidence level associated therewith.

The individual cooperating perception results may be filtered in dependence on their respective timings and their respective initial confidence levels, the piece of contextual information communicated with the filtered perception result comprising relevant timing information of one or more of the individual perception results.

The user interface and the sensor system may be embodied in a wearable system to be worn by the user.

The method may be implemented during a video communication event, the sensor system being located at a remote location relative to the user interface.

According to a second embodiment of the present disclosure, there is provided an information extraction system for selectively communicating perception results to a user comprising: an input configured to receive, from a sensor system, incoming sensor signals; one or more processors configured to, in response to an update instruction, use a current confidence level of each perception result of a set of perception results to determine whether or not to communicate that perception result at the user interface, the perception results determined by processing the sensor signals using at least one perception algorithm; and a user interface configured to communicate perception results to the user; wherein at least one of the perception results is communicated at the user interface together with at least one piece of contextual information, without communicating the current confidence level that caused the perception result to be outputted, the current confidence level having been at least partially derived from the piece of contextual information.

According to a third aspect of the present disclosure, there is provided a computer program, stored on a transitory or non-transitory storage medium, for programming a computer system to implement the functionality or steps of any preceding claim.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A computer implemented method of selectively communicating perception results to a user, the method comprising:

receiving a sensor signal from a sensor system;

processing the sensor signal using a perception algorithm to generate a number of perception results, wherein each perception result of the number of perception results is an identity of a bystander and is associated with a time at which the perception result was obtained and with an initial confidence level;

computing, for each perception result, a current confidence level based at least in part on an elapsed time since the time at which the perception result was obtained and on the initial confidence level;

receiving an indication of information a user would like to receive on a user interface;

determining, based on the received indication and the current confidence level of each perception result of the number of perception results, whether or not to communicate that perception result to the user interface; and communicating at least one of the perception result to the user interface together with a piece of contextual information, without communicating the current confidence level.

2. The computer implemented method according to claim 1, wherein the perception algorithm comprises at least one of: a facial recognition algorithm, a pose tracking algorithm, or an object recognition algorithm.

3. The computer implemented method according to claim 1, wherein the piece of contextual information is a timing of the perception result, such as an elapsed time since the perception result was obtained, or a time at which it was obtained.

4. The computer implemented method according to claim 3, wherein the current confidence level decays as an age of the perception result increases when the sensor system is unable to verify or repeat the perception result subsequently.

5. The computer implemented method according to claim 1, wherein the piece of contextual information comprises position information about a relative position of an entity relative to the sensor system, the perception result pertaining to the entity.

6. The computer implemented method according to claim 5, wherein the user is provided with cues via the user interface to guide the user such that the entity is in a better relative position to the sensor system, the better relative position being a relative position at which the perception result can be obtained with a higher confidence level.

7. The computer implemented method according to claim 1, wherein the at least one of the perception results and the piece of contextual information are communicated in non-visual form.

8. The computer implemented method according to claim 1, wherein the indication of information a user would like to receive on a user interface is instigated either manually by the user via the user interface or automatically.

9. The computer implemented method according to claim 1, wherein the at least one of the perception results is a filtered perception result derived by filtering individual cooperating perception results in dependence on respective individual contextual information associated therewith; and wherein the individual cooperating perception results are filtered in dependence on their individual contextual information and respective initial confidence level associated therewith.

10. The computer implemented method according to claim 9, wherein the individual cooperating perception results are filtered in dependence on their respective timings and their respective initial confidence levels, the piece of contextual information communicated with the filtered perception result comprising relevant timing information of one or more of the individual cooperating perception results.

11. The computer implemented method according to claim 1, wherein the user interface and the sensor system are embodied in a wearable system to be worn by the user.

12. The computer implemented method according to claim 1, wherein the method is implemented during a video communication event, the sensor system being located at a remote location relative to the user interface.

13. The computer implemented method according to claim 1, wherein an initial confidence value is calculated by the perception algorithm for each perception result, wherein the current confidence level is a function of the contextual information and the initial confidence value.

14. The computer implemented method according to claim 1, wherein the sensor system is a capture device configured to gather images of the bystander near the user.

15. The computer implemented method according to claim 14, wherein the capture device is a wearable device.

16. An information extraction system for selectively communicating perception results to a user comprising:

an input configured to receive a sensor signal from a sensor system;

a processor configured to:

process the sensor signal using a perception algorithm to generate a number of perception results, wherein each perception result of the number of perception results is an identity of a bystander and is associated with a time at which the perception result was obtained and with an initial confidence level;

compute, for each perception result, a current confidence level based at least in part on an elapsed time since the time at which the perception result was obtained and on the initial confidence level;

receive an indication of information a user would like to receive on a user interface;

determine, based on the received indication and the current confidence level of each perception result of the number of perception results, whether or not to communicate that perception result to the user; and a user interface configured to communicate perception results to the user at least one of the perception results together with a piece of contextual information, without communicating the current confidence level.

17. The information extraction system according to claim 16, wherein the sensor signal is from a wearable capture device and includes an image of the bystander near the user.

18. The information extraction system according to claim 17, wherein the wearable capture device includes an audio output device.

19. The information extraction system according to claim 16, wherein the processor is embodied on a mobile communication device.

20. A non-transitory computer storage medium comprising computer-executable instructions, which, when executed by a processing unit, perform a method comprising:

receiving a sensor signal from a sensor system;

processing the sensor signal using a perception algorithm to generate a number of perception results, wherein each perception result of the number of perception results is an identity of a bystander and is associated with a time at which the perception result was obtained and with an initial confidence level;

computing, for each perception result, a current confidence level based at least in part on an elapsed time since the time at which the perception result was obtained and on the initial confidence level;

receiving an indication of information a user would like to receive on a user interface;

determining, based on the received indication and the current confidence level of each perception result of the number of perception results, whether or not to communicate that perception result to a user interface; and communicating at least one of the perception results to the user interface together with a piece of contextual information, without communicating the current confidence level.

* * * * *